(12) United States Patent
Jin et al.

(10) Patent No.: US 9,943,818 B2
(45) Date of Patent: Apr. 17, 2018

(54) STEAM-HYDROCARBON REFORMING REACTOR

(71) Applicant: Air Products and Chemicals, Inc., Allentown, PA (US)

(72) Inventors: Bo Jin, Orefield, PA (US); Wenyuan Li, Basking Ridge, NJ (US); Xianming Jimmy Li, Orefield, PA (US); William Robert Licht, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 145 days.

(21) Appl. No.: 15/186,911

(22) Filed: Jun. 20, 2016

(65) Prior Publication Data

US 2017/0361291 A1 Dec. 21, 2017

(51) Int. Cl.

| | |
|---|---|
| *B01J 7/02* | (2006.01) |
| *B01J 23/755* | (2006.01) |
| *B01J 21/04* | (2006.01) |
| *B01J 35/04* | (2006.01) |
| *C01B 3/40* | (2006.01) |
| *B01J 23/745* | (2006.01) |
| *B01J 35/00* | (2006.01) |

(52) U.S. Cl.
CPC .............. *B01J 7/02* (2013.01); *B01J 21/04* (2013.01); *B01J 23/745* (2013.01); *B01J 23/755* (2013.01); *B01J 35/0006* (2013.01); *B01J 35/04* (2013.01); *C01B 3/40* (2013.01); *C01B 2203/0233* (2013.01); *C01B 2203/1017* (2013.01); *C01B 2203/1029* (2013.01); *C01B 2203/1058* (2013.01); *C01B 2203/1082* (2013.01); *C01B 2203/1235* (2013.01)

(58) Field of Classification Search
CPC combination set(s) only.
See application file for complete search history.

(56) References Cited

U.S. PATENT DOCUMENTS

| | | | |
|---|---|---|---|
| 4,203,950 A | 5/1980 | Sederquist | |
| 4,810,685 A * | 3/1989 | Twigg | B01J 35/04 502/60 |
| 5,718,881 A | 2/1998 | Sederquist et al. | |
| 6,797,244 B1 * | 9/2004 | Lesieur | H01M 8/0631 165/DIG. 395 |
| 6,890,878 B2 | 5/2005 | Moore | |
| 7,731,935 B2 | 6/2010 | Brady et al. | |

(Continued)

FOREIGN PATENT DOCUMENTS

WO 2009014800 A1 1/2009

OTHER PUBLICATIONS

Ashby, Michael F., "Metal Foams: A Design Guide"; Materials and Design; vol. 23, No. 1; Feb. 1, 2002.

(Continued)

*Primary Examiner* — Kaity Chandler
(74) *Attorney, Agent, or Firm* — Bryan C. Hoke, Jr.

(57) ABSTRACT

Steam-hydrocarbon reforming reactor with a reformer tube containing ceramic-supported catalyst pellets and metal foam particles. The ceramic-supported catalyst pellets have a porous support comprising one or more of alumina, calcium aluminate, and magnesium aluminate. The metal foam particles comprise Fe and/or Ni. The ceramic-supported catalyst pellets and metal foam particles may be layered or interspersed.

17 Claims, 1 Drawing Sheet

(56) References Cited

U.S. PATENT DOCUMENTS

| | | | |
|---|---|---|---|
| 9,604,200 B2* | 3/2017 | Farnell | B01J 23/894 |
| 2002/0136677 A1* | 9/2002 | Sederquist | B01B 1/005 |
| | | | 48/127.9 |
| 2003/0083196 A1* | 5/2003 | Korotkikh | B01D 53/864 |
| | | | 502/326 |
| 2003/0185721 A1* | 10/2003 | Wang | B01J 8/0285 |
| | | | 422/177 |
| 2004/0075084 A1* | 4/2004 | Kramer | B01J 8/0446 |
| | | | 252/373 |
| 2005/0191233 A1* | 9/2005 | Jiang | B01J 21/066 |
| | | | 423/651 |
| 2007/0082236 A1* | 4/2007 | Lee | B01J 23/16 |
| | | | 429/423 |
| 2007/0238610 A1* | 10/2007 | Chen | B01J 23/63 |
| | | | 502/330 |
| 2008/0148940 A1 | 6/2008 | Bohm et al. | |
| 2008/0171218 A1 | 7/2008 | Naumann et al. | |
| 2008/0302104 A1* | 12/2008 | Hwang | F02C 1/005 |
| | | | 60/723 |
| 2009/0258263 A1 | 10/2009 | Fujioka et al. | |
| 2010/0095590 A1* | 4/2010 | Ahmed | C01B 3/382 |
| | | | 48/127.9 |
| 2010/0294994 A1* | 11/2010 | Basini | B01J 4/002 |
| | | | 252/373 |
| 2010/0329947 A1* | 12/2010 | Fischel | B01J 10/007 |
| | | | 422/198 |
| 2011/0085967 A1* | 4/2011 | Raybold | C01B 3/382 |
| | | | 423/652 |
| 2011/0105305 A1* | 5/2011 | Del-Gallo | B01D 39/2051 |
| | | | 502/74 |
| 2013/0220239 A1* | 8/2013 | McCann | F02B 43/08 |
| | | | 123/3 |
| 2013/0294976 A1 | 11/2013 | Mita et al. | |
| 2013/0309165 A1* | 11/2013 | Koo | B01J 37/08 |
| | | | 423/656 |
| 2014/0004259 A1 | 1/2014 | Walther et al. | |
| 2014/0121433 A1* | 5/2014 | Cizeron | C07C 2/84 |
| | | | 585/330 |
| 2016/0159714 A1* | 6/2016 | Zubrin | C07C 29/152 |
| | | | 518/703 |
| 2016/0208175 A1* | 7/2016 | Groppi | B01J 8/067 |
| 2016/0257565 A1* | 9/2016 | Reiners | H01M 8/0618 |

OTHER PUBLICATIONS

Kim, et al., "A review on manufacturing and application of open-cell metal foam", 8th International Conf. on Porous Metals and Metallic Foams, Metfoam, 2013, Procedia Materials Science, vol. 4, pp. 305-309, 2014.

* cited by examiner

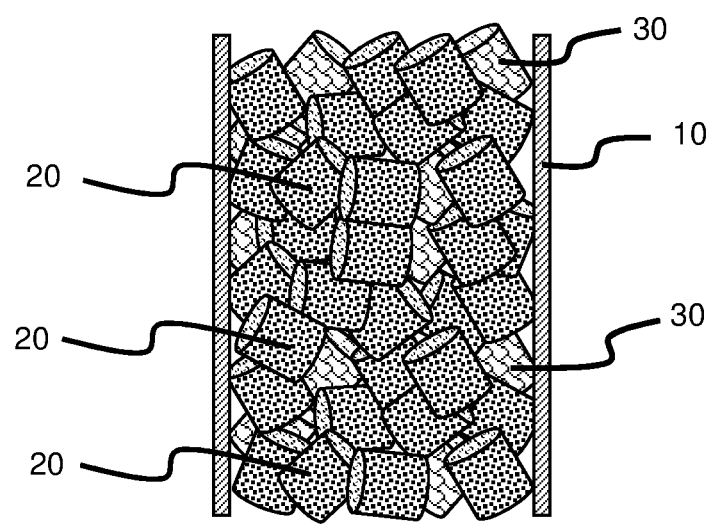

STEAM-HYDROCARBON REFORMING REACTOR

BACKGROUND

Hydrogen production by catalytic steam-hydrocarbon reforming is typically performed in catalyst-containing reformer tubes in a reforming furnace. The catalyst-containing reformer tubes are cycled from ambient temperature to high operating temperatures during startup and then back to ambient temperature during a shutdown, which can be planned or unplanned.

Catalyst pellets are packed in the reformer tubes. When the reformer tubes are heated, the diameters of the reformer tubes increase due to thermal expansion and while the catalyst pellets may also expand due to thermal expansion, there is an expansion mismatch and the catalyst pellets resettle in the tubes, filling up the space created by the tube expansion. When the reformer tubes are later cooled during a shutdown, the diameters of the reformer tubes decrease. The catalyst pellets, which are tightly packed in the reformer tubes, are compressed by the reformer tube walls and the catalyst pellets may break.

The pieces of the broken catalyst pellets may fill in the interstitial space between the catalyst pellets and thereby cause increased flow resistance for the reactant gases flowing through the reformer tubes. The increased flow resistance increases the pressure drop in the reformer tubes. The densification of the catalyst bed may occur locally leading to maldistribution of the reactant gases flowing through the packed bed which can lead to hot spot formation on the reformer tube walls.

Reformer tube failures are typically associated with high metal temperatures, but may also be associated with catalyst compaction.

Industry desires to be able to thermally cycle reformer tubes in order to accommodate startup and shutdown of the reformer furnace.

Industry desires to avoid and prevent crushing and breaking of catalyst pellets in the reformer tubes.

Industry desires the ability to extend the life of the reformer catalyst and not to have to replace the catalyst due to "hot spots" or flow maldistribution that results from catalyst compaction.

Industry desires to avoid and prevent rupture of reformer tubes.

Industry desires solutions to the above problems that do not decrease the efficiency and/or capacity of the steam-hydrocarbon reforming process.

BRIEF SUMMARY

There are several aspects of the invention as outlined below. In the following, specific aspects of the invention are outlined below. The reference numbers and expressions set in parentheses are referring to an example embodiment explained further below with reference to the FIGURE. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

Aspect 1. A steam-hydrocarbon reforming reactor comprising:
 a reformer tube (10);
 a plurality of ceramic-supported catalyst pellets (20) each ceramic-supported catalyst pellet (20) comprising a catalyst material and having a porous support comprising one or more of alumina, calcium aluminate, and magnesium aluminate; and
 a plurality of metal foam particles (30), each metal foam particle (30) comprising at least one metal selected from the group consisting of Fe and Ni;
 wherein the plurality of ceramic-supported catalyst pellets (20) and the plurality of metal foam particles (30) form a packed bed region within the reformer tube (10).

Aspect 2. The reforming reactor of aspect 1 wherein the catalyst material is nickel.

Aspect 3. The reforming reactor of aspect 1 or aspect 2 wherein each metal foam particle comprises open-cell metal foam.

Aspect 4. The reforming reactor of any one of the preceding aspects wherein each ceramic-supported catalyst pellet comprises 2 to 40 weight % nickel.

Aspect 5. The reforming reactor of any one of the preceding aspects wherein each ceramic-supported catalyst pellet of the plurality of ceramic-supported catalyst pellets (20) has a porosity ranging from 10% to 50% or ranging from 30% to 45%.

Aspect 6. The reforming reactor of any one of the preceding aspects wherein each metal foam particle of the plurality of metal foam particles (30) has a porosity ranging from 55% to 99% or ranging from 75% to 96%.

Aspect 7. The reforming reactor of any one of the preceding aspects wherein the packed bed region containing the plurality of ceramic-supported catalyst pellets (20) and the plurality of metal foam particles (30) is at least 1 meter long, wherein the packed bed region has a volume fraction of metal foam particles (30), and wherein the metal foam particles (30) are present in the packed bed region in an amount where the volume fraction of the metal foam particles (30) ranges from 0.01 to 0.5 or ranges from 0.1 to 0.30.

Aspect 8. The reforming reactor of aspect 7 wherein the reformer tube (10) is oriented vertically, the reformer tube (10) having an upper end and a lower end, wherein the packed bed region containing the plurality of ceramic-supported catalyst pellets (20) and the plurality of metal foam particles (30) is located proximate the lower end of the reformer tube (10).

Aspect 9. The reforming reactor of aspect 7 or aspect 8 wherein the reformer tube (10) is oriented vertically, the reformer tube (10) enclosing a vertically oriented packed bed comprising the packed bed region as a first vertical region and comprising a second vertical region which is at least 1 meter long and is located on top of the first vertical region, the second vertical region containing a plurality of ceramic-supported catalyst pellets (20) each comprising a catalyst material and having a porous support comprising one or more of alumina, calcium aluminate, and magnesium aluminate, wherein the second vertical region does not contain metal foam particles or contains metal foam particles (30) at a volume fraction which is smaller than the volume fraction of the metal foam particles (30) of the first region.

Aspect 10. The reforming reactor of any one of aspects 7 to 9 wherein the reformer tube (10) is oriented vertically, the reformer tube (10) enclosing a vertically oriented packed bed comprising a plurality of ceramic-supported catalyst pellets (20) each comprising a catalyst material and having a porous support comprising one or more of alumina, calcium aluminate, and magnesium aluminate, the vertically oriented packed bed having an upper bed end and a lower bed end, wherein the packed bed region containing the plurality of ceramic-supported catalyst pellets (20) and the plurality of metal foam particles (30) has a total vertical length that is smaller than the distance between the lower bed end and the upper bed end and is located closer to the lower bed end than to the upper bed end.

Aspect 11. The reforming reactor of any one of aspects 7 to 10 wherein the reformer tube (10) is oriented vertically, the reformer tube (10) enclosing a vertically oriented packed bed comprising a plurality of ceramic-supported catalyst pellets (20) each comprising a catalyst material and having a porous support comprising one or more of alumina, calcium aluminate, and magnesium aluminate, the vertically oriented packed bed having an upper bed end and a lower bed end, wherein the packed bed region containing the plurality of ceramic-supported catalyst pellets (20) and the plurality of metal foam particles (30) is forming the lower bed end.

Aspect 12. The reforming reactor of any one of the preceding aspects wherein the packed bed region containing the plurality of ceramic-supported catalyst pellets (20) and the plurality of metal foam particles (30) has a Young's modulus ranging from 0.0001 to 0.1 GPa as measured at 25° C.

Aspect 13. The reforming reactor of any one of the preceding aspects wherein each of the plurality of ceramic-supported catalyst pellets (20) has a median pore diameter in a range of 10 nm to 1000 nm and wherein each of the plurality of metal foam particles (30) has a median pore diameter in a range of 0.1 mm to 10 mm, and may be preferably about 1 mm.

Aspect 14. The reforming reactor of any one of the preceding aspects wherein each of the plurality of ceramic-supported catalyst pellets (20) has a pore volume in a range of 0.015 $cm^3/g$ to 0.25 $cm^3/g$ and wherein each of the plurality of the plurality of metal foam particles (30) has a pore volume in a range of 0.2 $cm^3/g$ to 13 $cm^3/g$ or in a range from 0.2 $cm^3/g$ to 3.5 $cm^3/g$.

Aspect 15. The reforming reactor of any one of the preceding aspects wherein each of the plurality of metal foam particles (30) comprise at least one additional metal selected from the group consisting of Cr, and Al.

Aspect 16. The reforming reactor of any one of the preceding aspects wherein the plurality of ceramic-supported catalyst pellets (20) and the plurality of metal foam particles (30) form layers in the packed bed region.

Aspect 17. The reforming reactor of any one of aspects 1 to 15 wherein the plurality of ceramic-supported catalyst pellets (20) and the plurality of metal foam particles (30) are interspersed in the packed bed region.

BRIEF DESCRIPTION OF SEVERAL VIEWS OF THE DRAWINGS

The sole FIGURE is a schematic representation of a packed bed region interspersed with a plurality of ceramic-supported catalyst pellets and a plurality of metal foam particles.

DETAILED DESCRIPTION OF THE PREFERRED EMBODIMENTS

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The adjective "any" means one, some, or all indiscriminately of whatever quantity.

The term "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The phrase "at least one of" preceding a list of features or entities means one or more of the features or entities in the list of entities, but not necessarily including at least one of each and every entity specifically listed within the list of entities and not excluding any combinations of entities in the list of entities. For example, "at least one of A, B, or C" (or equivalently "at least one of A, B, and C" or equivalently "at least one of A, B, and/or C") has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The term "plurality" means "two or more than two."

The present disclosure relates to a steam-hydrocarbon reforming reactor for producing a synthesis gas product and/or a hydrogen product gas. Catalytic steam-hydrocarbon reforming, also called steam methane reforming (SMR), catalytic steam reforming, or steam reforming, is defined as any process used to convert reformer feedstock (any of various suitable hydrocarbons) into reformate by reaction with steam over a catalyst. Reformate, also called synthesis gas, or simply syngas, as used herein is any mixture comprising hydrogen and carbon monoxide. The reforming reaction is an endothermic reaction and may be described generally as $C_nH_m + n\,H_2O \rightarrow n\,CO + (m/2+n)\,H_2$. Hydrogen is generated when reformate is generated.

The steam-hydrocarbon reforming reactor is described with reference to the FIGURE.

The steam-hydrocarbon reforming reactor comprises a reformer tube 10. Reformer tubes, their geometry and materials of construction are well-known. Reformer tubes typically have a circular cross section. The reformer tube may have a length ranging from 8 meters to 16 meters.

The steam-hydrocarbon reforming reactor of the present disclosure comprises a plurality of ceramic-supported catalyst pellets 20. Ceramic-supported catalyst pellets for steam-hydrocarbon reforming are well-known and available commercially. Each ceramic-supported catalyst pellet 20 comprises a catalyst material suitable for catalyzing the reforming reaction (typically nickel) and a porous support. The porous support may comprise one or more of alumina, calcium aluminate, and magnesium aluminate.

A ceramic-supported catalyst pellet is defined as a catalyst material which is affixed on a support of ceramic material where the ceramic material does not directly participate in targeted catalytic reaction. The catalyst material may contain metals but the ceramic material is typically inorganic and nonmetallic. The ceramic support is often porous and has a large surface area, typically 1 to 50 m²/g. In use, reactants diffuse into the porous pellet and react at active, catalytic sites. The products of reaction then diffuse out of the pellet.

A pellet is defined herein as a densely packed but porous mass formed from smaller particles. A pellet is a self-supporting body. Suitable pellets may have physical dimensions ranging from 3 to 35 mm. Such pellets frequently have one or more holes and a characteristic length of between 0.5 mm and 2 mm. The characteristic length is defined as the volume of the pellet divided by the outside surface area of the pellet. The pellet may have any regular or irregular shape as desired. The pellet may be in the shape of a sphere, cylinder, tablet or the like.

For example, a cylinder having a diameter of 3 mm and a length of 3 mm, has a volume of about 21 mm³, an outside surface area of about 42 mm², and therefore a characteristic length of about 0.5 mm. A sphere having a radius of 3 mm has a characteristic length of 1 mm.

Each ceramic-supported catalyst pellet 20 of the plurality of ceramic-supported catalyst pellets 20 may comprise 2 to 40 weight % nickel.

Each ceramic-supported catalyst pellet of the plurality of ceramic-supported catalyst pellets may have a porosity ranging from 5% to 50% or ranging from 30% to 45%.

Porosity of the catalyst pellets is calculated as 100% −

$$\frac{\text{pellet density}}{\text{skeletal density}} \times 100\%,$$

where the pellet density is measured by Hg porosimetry and the skeletal density is measured by He pycnometry. Median pore diameter and porosity may be determined by mercury porosimetry at about 60,000 lbs. force pressure (266,893 Newton) as measured with a mercury porosimeter. Mercury porosimetry instruments and/or analysis may be provided by Micromeritics Instrument Corporation.

Each of the plurality of ceramic-supported catalyst pellets may have a median pore diameter in a range of 10 nm to 1000 nm. Each of the plurality of ceramic-supported catalyst pellets may have a pore volume in a range of 0.015 cm³/g to 0.25 cm³/g.

The steam-hydrocarbon reforming reactor of the present disclosure comprises a plurality of metal foam particles 30. Each metal foam particle 30 of the plurality of metal foam particles 30 comprise at least one metal selected from the group consisting of Fe and Ni. Some or all of the plurality of metal foam particles may comprise at least one additional metal selected from the group consisting of Cr and Al.

The selected metal foam particles should be able to support the weight of the catalyst bed plus the hydrodynamic forces (pressure drop) at the operating temperature.

A metal (or metallic) foam particle (also called metal sponge) is defined as a cellular or porous structure of a solid metal. The metal foam particles may comprise open-cell metal foam meaning that it is formed of an interconnected network of pores or closed-cell metal foam meaning that the pores are sealed and filled with gas. Preferably the metal foam used in the steam-hydrocarbon reforming reactor is open-cell foam.

Metal foams, their manufacture, and properties are described, for example, in the book "Metal Foams: A Design Guide," Ashby et al., Butterworth-Heinemenn, 2000, incorporated herein by reference.

Metal foam particles may be fabricated as disclosed in US 2014/0004259, incorporated herein by reference.

The characteristic length of the metal foam particle is defined as the volume of the particle divided by the outside surface area of the particle. The particle may have any regular or irregular shape as desired. The particle may be in the shape of a sphere, cylinder, tablet or the like.

The plurality of ceramic-supported catalyst pellets 20 and the plurality of metal foam particles 30 form a packed bed region within the reformer tube 10.

Preferably, the size and shape of the catalyst pellets and the shape of the metal foam particles are similar. If the catalyst pellets are cylindrical, then the metal foam particles are preferably cylindrical. If the catalyst pellets are spheres, then the metal foam particles are preferably spheres.

The plurality of ceramic-supported catalyst pellets and the plurality of metal foam particles may be layered in the packed bed. Ceramic-supported catalyst pellets and metal foam particles may be dumped into the reformer tube in an alternate manner to effect the layers of ceramic-supported catalyst pellets and layers of metal foam particles.

The plurality of ceramic-supported catalyst pellets and the plurality of metal foam particles may be interspersed in the packed bed. Ceramic-supported catalyst pellets and metal foam particles may be mixed together and dumped into the reformer tube to effect a randomly interspersed mixture of catalyst pellets and metal foam particles.

A mixture (either layered and/or interspersed) of metal foam particles 30 and ceramic-supported catalyst pellets 20 provides the benefit of allowing the packed bed to contract more easily when the reformer tube 10 contracts during cooling without crushing the more rigid ceramic-supported catalyst pellets 20. The metal foam particles 30 flex preferentially.

Each metal foam particle of the plurality of metal foam particles may have a porosity ranging from 55% to 99% or ranging from 75% to 96%.

Porosity of the metal foam is calculated as 100% −

$$\frac{\text{metal foam density}}{\text{base metal density}} \times 100\%$$

where the metal foam density can be measured by weighing the material and by measuring its volume using Archimedes' principle, i.e. by measuring its buoyancy in a liquid of given density. If the sample to be characterized does not have a closed outer skin, penetration of liquid into the pores has to be prevented by coating its surface, e.g. with a polymer film. The base metal density is normally known.

Each of the plurality of metal foam particles may have a median pore diameter in a range of 0.1 mm to 10 mm.

Each of the plurality of metal foam particles may have a pore volume in a range of 0.2 cm³/g to 13 cm³/g or in a range of 0.2 cm³/g to 3.5 cm³/g.

The packed bed region containing the plurality of ceramic-supported catalyst pellets 20 and the plurality of metal foam particles 30 may be at least 1 meter long. The packed bed region has a volume fraction of metal foam particles 30 and a volume fraction of ceramic-supported catalyst pellets 20. The metal foam particles may be present in the packed bed region in an amount where the volume fraction of the metal foam particles ranges from 0.01 to 0.5 or ranges from 0.1 to 0.30.

The reformer tube may be oriented vertically. The reformer tube then has an upper end and a lower end, where "upper" and "lower" have their normal meaning. The packed bed region containing the plurality of ceramic-supported catalyst pellets 20 and the plurality of metal foam particles 30 may be located proximate the lower end of the reformer tube.

The packed bed region containing the plurality of ceramic-supported catalyst pellets 20 and the plurality of metal foam particles 30 may have a Young's modulus ranging from 0.0001 to 0.1 GPa as measured at 25° C.

The Young's modulus of a packed bed is determined from the relationship between an incremental stress and an incremental strain of the packing after an initial deformation. The test apparatus includes a cylindrical test particle bed loaded with a vertical axial pressure provided by a hydraulic press (e.g. Instron 8801 Axial Servohydraulic Dynamic Testing System) and measured by a load cell. The axial displacement of the bed is measured by a Crack Opening Displacement (COD) transducer. The packed bed is assumed to be isotropic.

To determine the Young's modulus for a bed packed of pellets, the pellets were compressed using the Instron testing system. The force applied divided by the cross-sectional area of bed gives the compaction pressure (in Pa). The bed, having an initial bed height, $L_0$, is continuously compressed and the displacement, $\Delta L$, of the bed is measured. The speed of displacement was constant at about 0.1 mm/s and the force was measured simultaneous with the displacement. The compaction pressure is plotted as a function of the engineering strain, $$\frac{\Delta L}{L_0},$$

and the slope of the plot gives the Young's modulus for the packed bed. Tests can be conducted on several different packed beds of pellets of the same type to determine a mean value, preferably an arithmetic mean value, of the Young's modulus. If tests are conducted on several different packed beds of pellets of the same type, the mean value of the Young's modulus may range from 0.0001 to 0.1 GPa as measured at 25° C.

As the displacement is increased, there is a point where there is a sudden drop of the compaction pressure as well as an audible popping sound, which occurs when the pellets begin to break as a result of the load. This compaction pressure where the pellets begin to break marks the critical compaction pressure.

Example

A packed bed comprising commercial catalyst support pellets made from α-alumina was tested in the Instron system. From the data a Young's modulus for the packed bed was determined to be about 0.01 GPa. The critical compaction pressure was determined to be about 0.4 MPa. This means that some of the pellets will start to break when the engineering strain is about 0.04.

When metal foam pellets having the same size and same shape as the commercial catalyst support pellets are added to the packed bed, the Young's Modulus for the packed bed is reduced, for example, to 0.006 GPa. Since the Young's Modulus is reduced and the critical compaction pressure for the catalyst support pellets is the same (0.4 MPa), the packed bed with the metal foam pellets requires a greater engineering strain to reach the critical compaction pressure (i.e. about 0.065 for a Young's Modulus of 0.006 GPa).

The invention claimed is:

1. A steam-hydrocarbon reforming reactor comprising:
   a reformer tube;
   a plurality of ceramic-supported catalyst pellets each ceramic-supported catalyst pellet comprising a catalyst material and having a porous support comprising one or more of alumina, calcium aluminate, and magnesium aluminate; and
   a plurality of metal foam particles, each metal foam particle comprising at least one metal selected from the group consisting of Fe and Ni;
   wherein the plurality of ceramic-supported catalyst pellets and the plurality of metal foam particles form a packed bed region within the reformer tube; and wherein each of the plurality of the plurality of metal foam particles has a pore volume in a range of 0.2 cm³/g to 13 cm³/g.

2. The reforming reactor of claim 1 wherein the catalyst material is nickel.

3. The reforming reactor of claim 1 wherein each metal foam particle comprises open-cell metal foam.

4. The reforming reactor of claim 1 wherein each ceramic-supported catalyst pellet comprises 2 to 40 weight % nickel.

5. The reforming reactor of claim 1 wherein each ceramic-supported catalyst pellet of the plurality of ceramic-supported catalyst pellets has a porosity ranging from 10% to 50%.

6. The reforming reactor of claim 1 wherein each metal foam particle of the plurality of metal foam particles has a porosity ranging from 55% to 99%.

7. The reforming reactor of claim 1 wherein the packed bed region containing the plurality of ceramic-supported catalyst pellets and the plurality of metal foam particles is at least 1 meter long, wherein the packed bed region has a volume fraction of metal foam particles, and wherein the metal foam particles are present in the packed bed region in an amount where the volume fraction of the metal foam particles ranges from 0.01 to 0.5.

8. The reforming reactor of claim 7 wherein the reformer tube is oriented vertically, the reformer tube having an upper end and a lower end, wherein the packed bed region containing the plurality of ceramic-supported catalyst pellets and the plurality of metal foam particles is located proximate the lower end of the reformer tube.

9. The reforming reactor of claim 7 wherein the reformer tube is oriented vertically, the reformer tube enclosing a vertically oriented packed bed comprising the packed bed region as a first vertical region and comprising a second vertical region which is at least 1 meter long and is located on top of the first vertical region, the second vertical region containing a plurality of ceramic-supported catalyst pellets each comprising a catalyst material and having a porous support comprising one or more of alumina, calcium aluminate, and magnesium aluminate, wherein the second vertical region does not contain metal foam particles or contains metal foam particles at a volume fraction which is smaller than the volume fraction of the metal foam particles of the first region.

10. The reforming reactor of claim 7 wherein the reformer tube is oriented vertically, the reformer tube enclosing a vertically oriented packed bed comprising a plurality of ceramic-supported catalyst pellets each comprising a catalyst material and having a porous support comprising one or more of alumina, calcium aluminate, and magnesium aluminate, the vertically oriented packed bed having an upper bed end and a lower bed end, wherein the packed bed region containing the plurality of ceramic-supported catalyst pellets and the plurality of metal foam particles has a total vertical length that is smaller than the distance between the lower bed end and the upper bed end and is located closer to the lower bed end than to the upper bed end.

11. The reforming reactor of claim 7 wherein the reformer tube is oriented vertically, the reformer tube enclosing a vertically oriented packed bed comprising a plurality of ceramic-supported catalyst pellets each comprising a catalyst material and having a porous support comprising one or more of alumina, calcium aluminate, and magnesium aluminate, the vertically oriented packed bed having an upper bed end and a lower bed end, wherein the packed bed region containing the plurality of ceramic-supported catalyst pellets and the plurality of metal foam particles is forming the lower bed end.

12. The reforming reactor of claim 1 wherein the packed bed region containing the plurality of ceramic-supported catalyst pellets and the plurality of metal foam particles has a Young's modulus ranging from 0.0001 GPa to 0.1 GPa.

13. The reforming reactor of claim 1 wherein each of the plurality of ceramic-supported catalyst pellets has a median pore diameter in a range of 10 nm to 1000 nm and wherein each of the plurality of metal foam particles has a median pore diameter in a range of 0.1 mm to 10 mm.

14. The reforming reactor of claim 1 wherein each of the plurality of ceramic-supported catalyst pellets has a pore volume in a range of 0.015 $cm^3/g$ to 0.25 $cm^3/g$.

15. The reforming reactor of claim 1 wherein each of the plurality of metal foam particles comprise at least one additional metal selected from the group consisting of Cr, and Al.

16. The reforming reactor of claim 1 wherein the plurality of ceramic-supported catalyst pellets and the plurality of metal foam particles form layers in the packed bed region.

17. The reforming reactor of claim 1 wherein the plurality of ceramic-supported catalyst pellets and the plurality of metal foam particles are interspersed in the packed bed region.

* * * * *